United States Patent
Thomas (10) Patent No.: US 9,772,029 B2
(45) Date of Patent: Sep. 26, 2017

(54) PLANETARY CARRIER WITH SPRING CLUTCH

(71) Applicant: Akebono Brake Industry Co., Ltd., Chuo-ku, Tokyo (JP)

(72) Inventor: Carla Thomas, Royal Oak, MI (US)

(73) Assignee: Akebono Brake Industry Co., Ltd., Tokyo (JP)

( * ) Notice: Subject to any disclaimer, the term of this patent is extended or adjusted under 35 U.S.C. 154(b) by 161 days.

(21) Appl. No.: 14/795,342

(22) Filed: Jul. 9, 2015

(65) Prior Publication Data

US 2017/0009874 A1    Jan. 12, 2017

(51) Int. Cl.
| | | |
|---|---|---|
| *F16D 51/00* | (2006.01) | |
| *F16H 57/10* | (2006.01) | |
| *F16D 65/22* | (2006.01) | |
| *B60T 1/06* | (2006.01) | |
| *F16D 51/22* | (2006.01) | |

(Continued)

(52) U.S. Cl.
CPC ............. *F16H 57/10* (2013.01); *B60T 1/06* (2013.01); *F16D 51/22* (2013.01); *F16D 65/18* (2013.01); *F16D 65/22* (2013.01); *F16H 1/36* (2013.01); *F16D 2125/48* (2013.01);

(Continued)

(58) Field of Classification Search
CPC ......... F16H 2035/005; F16H 2035/006; F16H 57/10; F16H 2048/368; F16H 2048/201; F16H 48/22; F16H 2057/126; F16H 2057/127; F16D 2127/06; F16D 2125/50; F16D 41/206; F16D 1/0823; F16D 49/02; F16D 49/04

See application file for complete search history.

(56) References Cited

U.S. PATENT DOCUMENTS

| 3,361,235 A | 1/1968 | Sacchini |
|---|---|---|
| 3,539,041 A | 11/1970 | Sacchini |

(Continued)

FOREIGN PATENT DOCUMENTS

| EP | 2878849 A2 | 3/2015 |
|---|---|---|
| EP | 2878849 A2 | 6/2015 |

(Continued)

OTHER PUBLICATIONS

Machine translation of JP 05-202995 (no date).*
Machine translation of JP 06-32802 (no date).*

*Primary Examiner* — Nicholas J Lane
(74) *Attorney, Agent, or Firm* — The Dobrusin Law Firm, P.C.; Daniela M. Thompson-Walters (57) ABSTRACT

A planetary gear assembly comprising: a housing, which contains: a planetary carrier, a sun gear, at least one planetary gear, a ring gear, a coil spring; an input shaft; and an output shaft. The coil spring extends around at least a portion of the planetary carrier. The coil spring includes a first tang in communication with the ring gear and a second tang in communication with the housing. When torque is applied to the input shaft, the planetary carrier rotates within the coil spring in one or more driving directions so that torque is transferred to the output shaft. When no torque is applied to the input shaft and torque is applied to the output shaft, the coil spring constricts and provides sufficient contact force to the planetary carrier and housing to prevent the planetary carrier from moving relative to the housing in at least one of the driving directions.

19 Claims, 5 Drawing Sheets

(51) Int. Cl.
*F16D 65/18* (2006.01)
*F16H 1/36* (2006.01)
*F16D 125/48* (2012.01)
*F16D 125/50* (2012.01)
*F16D 127/00* (2012.01)
*F16D 127/06* (2012.01)

(52) U.S. Cl.
CPC .... *F16D 2125/50* (2013.01); *F16D 2127/004* (2013.01); *F16D 2127/06* (2013.01)

(56) References Cited

U.S. PATENT DOCUMENTS

| | | | |
|---|---|---|---|
| 3,559,781 A | 2/1971 | Brunelle | |
| 3,926,286 A | 12/1975 | Johnson | |
| 4,257,497 A | 3/1981 | Schroeder | |
| 4,321,992 A | 3/1982 | Gallo | |
| 4,499,787 A | 2/1985 | Leistner | |
| 4,858,494 A * | 8/1989 | Healy | B62M 11/18 192/64 |
| 4,953,669 A | 9/1990 | Severinsson | |
| 4,986,400 A | 1/1991 | Heller | |
| 5,090,530 A | 2/1992 | Leone | |
| 5,637,051 A * | 6/1997 | Nakamura | B62D 5/04 475/301 |
| 5,769,189 A | 6/1998 | Heibel et al. | |
| 5,913,390 A | 6/1999 | Hostetler | |
| 5,931,268 A | 8/1999 | Kingston | |
| 5,967,274 A | 10/1999 | Leone | |
| 6,012,556 A | 1/2000 | Blosch | |
| 6,364,085 B1 | 4/2002 | Ueno | |
| 6,637,571 B2 | 10/2003 | Arnold | |
| 6,700,246 B1 | 3/2004 | Bruhn | |
| 6,938,736 B2 | 9/2005 | Takahashi | |
| 7,214,161 B2 | 5/2007 | Jinbo | |
| 7,648,014 B2 | 1/2010 | Koga | |
| 8,056,688 B2 | 11/2011 | Kossett | |
| 8,181,750 B2 | 5/2012 | Homma et al. | |
| 8,746,421 B2 | 6/2014 | Tarhan | |
| 9,051,982 B2 | 6/2015 | Park | |
| 9,140,321 B2 | 9/2015 | Drennen | |
| 9,145,950 B2 | 9/2015 | Dettenberger et al. | |
| 9,188,182 B2 | 11/2015 | Park et al. | |
| 9,297,433 B2 | 3/2016 | Takewaki et al. | |
| 9,340,194 B2 | 5/2016 | Giering | |
| 9,476,469 B2 * | 10/2016 | Gutelius | F16D 65/14 |
| 2006/0113150 A1 | 6/2006 | Baumgartner | |
| 2006/0219486 A1 | 10/2006 | Wagner | |
| 2009/0005213 A1 * | 1/2009 | Bogner | F16H 1/28 475/331 |
| 2009/0294224 A1 | 12/2009 | Sakashita | |
| 2010/0038203 A1 | 2/2010 | Wheals | |
| 2012/0279336 A1 * | 11/2012 | Dommsch | E05F 11/505 74/411.5 |
| 2013/0203554 A1 | 8/2013 | Dettenberger et al. | |
| 2014/0041975 A1 | 2/2014 | Takewaki et al. | |
| 2014/0166413 A1 | 6/2014 | Giering | |
| 2014/0166417 A1 | 6/2014 | De Taeye et al. | |
| 2015/0008091 A1 | 1/2015 | Drennen | |
| 2015/0036203 A1 | 2/2015 | Nitsche et al. | |
| 2015/0129371 A1 | 5/2015 | Gutelius | |
| 2015/0144438 A1 | 5/2015 | Park et al. | |
| 2015/0354650 A1 | 12/2015 | Bull | |
| 2016/0102718 A1 | 4/2016 | Polack et al. | |
| 2016/0123420 A1 | 5/2016 | Shin | |
| 2016/0223040 A1 | 8/2016 | Watzek et al. | |
| 2016/0238094 A1 | 8/2016 | Gutelius et al. | |
| 2016/0377137 A1 | 12/2016 | Ohlig et al. | |

FOREIGN PATENT DOCUMENTS

| | | | |
|---|---|---|---|
| JP | 05202995 A * | 8/1993 | |
| JP | 0632802 U * | 4/1994 | |
| JP | WO 2008123423 A1 * | 10/2008 | F16D 41/206 |
| JP | 2009052682 A | 3/2009 | |
| WO | 2015071071 A2 | 5/2015 | |
| WO | 2015097010 A2 | 7/2015 | |
| WO | 2015/151052 A1 | 10/2015 | |

* cited by examiner

FIG. 9

PLANETARY CARRIER WITH SPRING CLUTCH

FIELD

The present teachings relate generally to a planetary reduction gear system. More particularly, the present teachings relate to a planetary gear reduction system which can prevent back drive of the system. The present teachings may find particular use in braking systems.

BACKGROUND

Generally a planetary gear reduction system includes an input shaft connected to a sun gear and an output shaft connected to a planetary carrier. Torque is typically applied to the input shaft in at least one direction of rotation which results in an increased torque in the same direction at the output shaft. If the planetary gear system is used to deflect an elastic system, when the torque is removed from the input shaft, there is strain energy in the system. The strain energy applies a torque on the output shaft opposite of the torque that was applied to the input shaft. The strain energy results in the system back-driving, such that the torque that was applied to the output shaft is at least partially released. Attempts have been made to incorporate a "self-locking" feature to ensure that the force applied to the planetary gear reduction system so that torque is maintained after the motor applied current is turned off. The self-locking function is typically incorporated in the system by using an element which cannot be back-driven, such as a worm type reduction gear or a short pitch drive screw. However, these elements, which cannot be back-driven, incorporate friction levels which are incompatible with high efficiency so that either speed is sacrificed or a larger motor is used to achieve a desired result.

Examples of brake systems using one-way clutches are disclosed in U.S. Pat. Nos. 7,648,014 and 6,938,736 which are expressly incorporated herein by reference for all purposes. It would be attractive to have a planetary gear assembly that is able to prevent back-driving and a planetary gear assembly which is able to retain the torque applied to the output shaft without having to continuously apply torque to the input shaft. What is needed is a planetary gear assembly compatible with a braking system in which the system allows use of high efficiency mechanisms for speed reduction and rotary to linear conversion stages. What is needed is a system which can reduce the size and cost of components.

SUMMARY

The present disclosure relates to a planetary gear assembly comprising: (a) a housing which contains: (i) a planetary carrier; (ii) a sun gear; (iii) at least one planetary gear; (iv) a ring gear; and (v) a coil spring which extends around all or a portion of the planetary carrier; (b) an input shaft; and (c) an output shaft; wherein the coil spring includes a first tang that is in communication with the ring gear and a second tang that is in communication with the housing; wherein when torque is applied to the input shaft, the planetary carrier rotates within the coil spring in one or more driving directions so that torque is transferred to the output shaft; and wherein when no torque is applied to the input shaft and torque in one direction is applied to the output shaft, the coil spring constricts and provides sufficient contact force to the planetary carrier and to the housing to prevent the planetary carrier from moving relative to the housing in at least one of the driving directions.

The present disclosure relates to a brake system comprising: (a) a planetary gear assembly comprising: (i) a housing which contains: a planetary carrier, a sun gear, at least one planetary gear, a ring gear, and a coil spring which extends around all or a portion of the planetary carrier, the coil spring including a first tang that is in communication with the ring gear and a second tang that is in communication with the housing; (ii) an input shaft; and (iii) an output shaft; (b) at least one rotary to linear actuator in communication with the planetary gear assembly; (c) at least one torque multiplication assembly at least partially in communication with the input shaft or the output shaft of the planetary gear assembly; wherein when torque is applied to the input shaft the planetary carrier rotates within the coil spring in one or more driving directions so that torque is transferred to the output shaft; wherein when no torque is applied to the input shaft and torque in one direction is applied to the output shaft, the coil spring constricts and provides sufficient contact force to the planetary carrier and to the housing to prevent the planetary carrier from moving relative to the housing in at least one of the driving directions; wherein when torque is provided by the output shaft directly or indirectly to the rotary to linear actuator this results in movement of at least a portion of the rotary to linear actuator so that two or more brake shoes or brake pads respectively are moved to create a brake force or moved to release a brake force; and wherein after a brake force is created and when no torque is applied to the input shaft, the coil spring constricts and applies sufficient force to the planetary carrier and the housing so that movement of the planetary carrier is prevented in at least one of the driving directions.

The planetary gear assembly of the disclosure is able to prevent back-driving by means of a coil spring. The planetary gear assembly of the disclosure is able to retain torque applied to the output shaft after torque is removed from the input shaft. The planetary gear assembly of the disclosure is compatible with a braking system such as an electric park brake system. The planetary gear assembly of the disclosure provides for a higher efficiency mechanism as compared to worm type reduction gears, short pitch drive screws, and other known mechanisms for preventing back-driving. The planetary gear assembly allows for lower cost components and can be reduced in size as compared to other systems for speed reduction and rotary to linear conversion stages.

DETAILED DESCRIPTION

The explanations and illustrations presented herein are intended to acquaint others skilled in the art with the present teachings, its principles, and its practical application. The specific embodiments of the present teachings as set forth are not intended as being exhaustive or limiting of the present teachings. The scope of the present teachings should be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The present teachings provide a planetary gear assembly. The planetary gear assembly functions to multiply an input torque, provide a greater output torque, and/or provide a speed reduction. The planetary gear assembly may connect a motor to a driven member so that the planetary gear assembly multiplies torque and provides that torque to the driven member. The planetary gear assembly includes a housing which contains: a planetary carrier, a sun gear, at least one planetary gear, a ring gear, and a coil spring which extends around all or a portion of the planetary carrier. The planetary gear assembly includes an input shaft and an output shaft. The planetary gear assembly may be a single pinion or a double pinion planetary gear set. The coil spring includes a first tang that is in communication with the ring gear. The coil spring includes a second tang that is in communication with the housing. The planetary gear assembly functions so that when torque is applied to the input shaft the planetary carrier rotates within the coil spring in one or more driving directions so that torque is provided to the output shaft. The planetary gear assembly functions or includes a feature which functions such that that when no torque is applied to the input shaft and torque in one direction is applied to the output shaft, the coil spring constricts and provides sufficient contact force to the planetary carrier and to the housing to prevent the planetary carrier from moving relative the housing in at least one of the driving directions.

The planetary gear assembly of the disclosure comprises an input shaft. The input shaft may be located at least partially within a housing. The input shaft may function to receive torque in one or more driving directions. The input shaft may function to transfer power from a motor. The input shaft may function to transfer torque in one or more driving directions to the sun gear. The input shaft may be cylindrical. The input shaft may have a first end and a second end. The input shaft may be in communication with a drive source, such as a motor, at the first end. The drive source may apply torque to the input shaft in one or more driving directions. For example, the drive source may apply a first direction of torque (e.g., clockwise), a second direction of torque (e.g., counterclockwise), or both to the input shaft. The input shaft may be in communication with a sun gear. For example, the input shaft may receive a sun gear at its second end (i.e., an end opposite a motor). The input shaft may supply torque to a sun gear. The input shaft may have an outer diameter about equal to or less than the inner diameter of the sun gear.

The planetary gear assembly of the disclosure comprises a sun gear. The sun gear functions to receive an input torque, transfer a torque, and/or provide torque to one or more components of the planetary gear assembly. The sun gear may transfer an input torque. The sun gear may transfer a torque applied to the input shaft. The sun gear may provide torque to one or more planetary gears. The sun gear may be in rotatable communication with the input shaft. Preferably, the sun gear receives the input shaft. The sun gear includes an opening for receiving the input shaft. Preferably the opening is concentric with the diameter of the sun gear. Preferably the opening extends along the entire length of the sun gear. The opening may be sized to receive the input shaft. The opening may have a diameter about equal to or greater than the input shaft. The sun gear includes a plurality of teeth around an outside. The teeth are configured to engage with other gears of the planetary gear assembly, such as one or more planetary gears. The sun gear may be surrounded by multiple planetary gears. As the sun gear is rotated by the input shaft, the sun gear may provide torque to the one or more planetary gears.

The planetary gear assembly of the disclosure includes one or more planetary gears. The one or more planetary gears may transfer torque, such as an input torque. The one or more planetary gears may provide torque to the ring gear. The one or more planetary gears may transfer torque to the planetary carrier, such as the torque received by input shaft. The one or more planetary gears may reduce rotation speed, such as the rotation speed received by the input shaft. The one or more planetary gears include a plurality of teeth around the outside perimeter. The teeth may be configured to engage with other gears of the planetary gear assembly, such as the sun gear, the ring gear, or other planetary gears. The one or more planetary gears may be located between the sun gear and the ring gear. The one or more planetary gears may rotate within the ring gear. The one or more planetary gears may be attached to the planetary carrier. The one or more planetary gears may be configured for a single pinion or a double pinion planetary gear system. In a single pinion planetary gear system, all of the one or more planetary gears may be engaged with both the sun gear and the ring gear. In a double pinion planetary gear system, the one or more planetary gears may include inner planetary gears and outer planetary gears. The inner planetary gears may be engaged with the sun gear and the outer planetary gears. The outer planetary gears may be engaged with the inner planetary gears and the ring gear.

The planetary gear assembly of the disclosure includes a planetary carrier. The planetary carrier may transfer an input torque. The planetary carrier functions to provide an output torque. The planetary carrier may support one or more planetary gears and preferably a plurality of planetary gears. The planetary carrier may receive a portion of the housing, such as an inner cylindrical portion of the housing. The planetary carrier includes a carrier portion. The carrier portion may be cylindrical. The planetary carrier includes one or more planetary gear shafts. The one or more planetary gear shafts may extend from the carrier portion. For example, the one or more planetary gear shafts may extend from a face of the carrier portion. The one or more planetary gear shafts may be integral with the planetary carrier. The one or more planetary gear shafts may be cylindrical. The one or more planetary gear shafts are sized to receive one or more planetary gears. For example, the one or more planetary gear shafts may have an outer diameter about equal to or less than the inner diameter of one or more planetary gears. For example, the one or more planetary gear shafts may have a length about greater than, about equal to, or about less than the length of the one or more planetary gears.

Preferably, the one or more planetary gear shafts have a length about equal to the length of the one or more planetary gears. The planetary carrier includes an output shaft. The output shaft may extend from the carrier portion. The output shaft may extend from a face opposite the planetary gear shafts. The output shaft may rotate in the same direction as the carrier portion.

The planetary gear assembly includes an output shaft. The output shaft may deliver an increased torque from the planetary gear assembly. The output shaft may provide torque to another system, such as a torque multiplication system. The output shaft may be part of a torque multiplication system, such that the output shaft of the planetary gear assembly is the input shaft of a second torque multiplication system. The output shaft may provide torque to a rotary to linear actuator. The output shaft may extend from the planetary carrier. The output shaft may be integral with the planetary carrier. When torque is applied to the input shaft in one or more driving directions, the output shaft may rotate in the same direction or an opposing direction as the one or more driving directions. For example, in a single pinion planetary gear assembly when a first direction of torque is applied to the input shaft by a drive source, such as a motor, the output drive shaft rotates in the same direction. In a double pinion planetary gear assembly, when a first direction of torque is applied to the input shaft the output shaft may rotate opposite the first direction of torque. For example, in a single pinion planetary gear assembly when a second direction of torque is applied to the input shaft by a drive source, such as a motor, the output drive shaft rotates in the same direction. In a double pinion planetary gear assembly, when a second direction of torque is applied to the input shaft the output shaft may rotate opposite the second direction of torque. The output shaft may receive torque. For example, when the input shaft does not receive torque, such as from a drive source, the planetary gear assembly may receive torque from an elastic system having strain energy and in communication with the output shaft. Such strain energy may provide torque to the output shaft in a direction opposite the torque applied by the input shaft. The opposing torque may be transferred to the planetary carrier. The planetary carrier may be restricted from rotating by the wrap spring.

The planetary gear assembly includes a ring gear. The ring gear functions to restrict the motion of the planetary gears such that torque is provided to the planetary carrier to rotate in one or more driving the directions (e.g., clockwise, counterclockwise, or both). The ring gear functions to engage with the wrap spring in such a way that the wrap spring in certain conditions does not restrict or prevent movement of the planetary carrier in at least one driving direction. The ring gear may be cylindrical in shape with a first end and a second end. The first end may be the end of the ring gear closest to the input shaft. The second end may be the end of the ring gear closest to the output shaft. The ring gear includes an outer circumferential surface and an inner circumferential surface. The ring gear includes a plurality of teeth around the inner circumferential surface The ring gear may surround at least a portion of the planetary gears, at least a portion of the planetary carrier, or both. Preferably, the ring gear surrounds the planetary carrier shafts and the planetary gears. The plurality of teeth is configured so that the plurality of teeth engage with the planetary gears. The ring gear is configured such that its freedom to rotate in the housing is limited; it can engage with a tang of the wrap spring.

The planetary gear assembly includes a housing. The housing may house one or more components, including: a planetary carrier, a sun gear, at least one planetary gear, a ring gear, a coil spring, or a combination thereof. The housing includes features to allow rotation of one or more components of the planetary gear assembly. The housing includes features to prevent or restrict rotation of one or more components of the planetary gear assembly. The housing may be cylindrical. The housing may be at least partially hollow. The housing includes an exterior perimeter surface and an interior perimeter surface. The housing includes a first end and a second end. The first end may be the end closest to the input shaft or the drive source. The second end may be the end furthest from the input shaft or the drive source. The second end may also be the end closest to the output shaft. The housing may contain part or all of one or more torque multiplication assemblies and some or all of the other components of the planetary gear assembly including the following components: the input shaft, the output shaft, or both. The housing includes one or more features for engaging different components, such as an aperture, channel, and/or an interior cylinder portion. The housing may engage the ring gear, the housing may restrict movement of the ring gear. The housing may retain a portion of a coil spring. For example, the housing may include an aperture, an inner cylinder portion, or both to contact a portion of the coil spring.

The housing may include an inner cylinder portion. The inner cylinder may function to engage with a feature of a component of the planetary gear assembly to restrict movement of another component, such as the output shaft, of the planetary gear assembly. The inner cylinder portion may engage with the coil spring. The inner cylinder portion may provide a contact surface for the coil spring to contract about when the coil spring is under tension. The inner cylinder portion may extend inward into the housing from an end of the housing, such as the end closest to the output shaft. For example, the inner cylinder portion may extend inward into the housing from the second end. The inner cylinder portion may by cylindrical. The inner cylinder portion may be concentrically located within the housing. The inner cylinder portion may be at least partially hollow. The inner cylinder portion may include an interior perimeter surface and an exterior perimeter surface. The inner cylinder may include a planar surface. The planar surface may be closest to the input end of the housing. The inner cylinder portion may include at least one outer diameter and preferably includes at least two outer diameters. At least one outer diameter may be about the same diameter or larger than the undeflected inner diameter of the coil spring, preferably at least one outer diameter is about the same diameter or larger than the undeflected inner diameter of the coil spring. The inner cylinder portion may be tiered. A first tier of the inner cylinder portion may be in contact with an end of the housing, such as the second end. The first tier may extend inward into the housing from an end by about 5% or more of the length of the housing, preferably by at least about 10% or more of the length of the housing, and most preferably by about 20% or more of the length of the housing. The first tier may extend inward into the housing from an end by about 50% of the length of the housing or less, about 40% of the length of the housing or less, or even about 30% of the length of the housing or less. The first tier may have an outer diameter. The outer diameter of the first tier may be less than, equal to, or greater than the outer diameter of the carrier portion of the planetary carrier. Preferably, the outer diameter is about equal to the outer diameter of the carrier portion of the planetary carrier. A second tier of the inner cylinder portion may extend inward into the housing. The second tier may extend from the first tier. The second tier may extend inward into the housing by about 5% or more of the length of the housing, preferably by at least about 10% or more of the length of the housing, and most preferably by about 20% or more of the length of the housing. The second tier may extend inward into the housing by about 50% or less of the length of the housing, preferably by at least about 40% or more of the length of the housing, and most preferably by about 30% or more of the length of the housing. The second tier may extend inward into the housing by about the same length as the first tier. The second tier may have an outer diameter. The diameter of the second tier may be about equal to or smaller than the first tier. The diameter of the second tier may be about equal to or smaller than the diameter of the undeflected inner diameter of the coil spring. The second tier may receive a portion of the planetary carrier. The diameter of the tier may be about equal to or smaller than a diameter of the planetary carrier, such as the carrier portion of the planetary carrier.

The planetary gear assembly includes a coil spring. The coil spring may restrict rotation of one or more components of the planetary gear assembly. The coil spring may prevent torque provided by the output shaft from transferring to the input shaft. The coil spring may prevent the planetary gear assembly from back driving when a drive source does not provide torque to the input shaft. The coil spring may be a helical torsion or wrap spring. The coil spring may have both an inner diameter and an outer diameter. The coil spring includes one or more tangs. For example, the coil spring may include a first tang at one end and a second tang at an opposing end. The coil spring may extend around all or a portion of the planetary carrier, the housing, or a combination of both. Preferably, the interior surface of the coil spring is in contact and encircles the outer surface of the carrier portion of the planetary carrier. Preferably, the coil spring is concentrically located around the carrier portion. Preferably, the interior surface of the coil spring is in contact and encircles the outer surface of the inner cylinder portion of the housing. Preferably, the coil spring is concentrically located around the inner cylinder portion. The coil spring can have any number of wraps or coils to extend around all or a portion of the planetary carrier, the housing, or both. For example, the coil spring can have one wrap or more, two wraps or more, ten wraps or more, twenty wraps or more, one-hundred wraps or more, or any number therebetween. The coil spring may have a deflected state and an undeflected state. In an undeflected state, the inner diameter of the coil spring may be about equal to or smaller than the outer diameter of the carrier portion of the planetary carrier, the inner cylinder portion of the housing, or both. The inner diameter of the coil spring in the undeflected state may be the measured inner diameter prior to the coil spring engaging with the planetary carrier, the housing, or both (e.g., prior to assembly). In a deflected state, the inner diameter of the coil spring may be about equal to the outer diameter of the carrier portion of the planetary carrier, the inner cylinder portion of the housing, or both. The inner diameter of the coil spring in the deflected state may be measured when the coil spring is engaged with the planetary carrier, the housing, or both. In the deflected state, the inner surface of the coil spring may be in contact with the planetary carrier, the housing, or both. The contact of the inner surface of the coil spring with the planetary carrier allows rotation of the planetary carrier, restricts rotation of the planetary carrier, or both. Rotation of the planetary carrier in one direction, such as the first direction, may be in a direction that tends to expand the coil spring and allows the planetary carrier to continue rotating. For example, when the planetary carrier is rotating in the first direction, the coil spring tends to expand such that there is minimal friction applied to the outer surface of the planetary carrier by the inner surface of the coil spring and the planetary carrier is able to continue rotating in the first direction. Rotation of the carrier in an opposing direction, such as the second direction, may be in a direction that tends to constrict the coil spring. For example, when the planetary carrier is rotating in the second direction, the coil spring tends to constrict about the planetary carrier. When the coil spring constricts about the planetary carrier there is an increased force applied to the outer surface of the planetary carrier by the inner surface of the coil spring and the planetary carrier is restricted or prevented from further rotating.

The ring gear may include one or more projections. The projections may function to limit the degree of rotation of the ring gear in at least one of the driving directions. The projection may extend from a surface of the ring gear, such as the outer circumferential surface of the ring gear. The projection may be engaged within a channel, such as a channel of the housing. The projection may be shaped as a tab, fin, pin, rod, or any other suitable protrusion extending from the ring gear. The projection may include one, two, three, or four wall surfaces. The projection may include an upper surface distanced from the ring gear outer circumferential surface. The projection may have a height measured as the distance from the ring gear outer circumferential surface to the upper surface of the projection. The projection may have a length and a width. For example, if the projection is rectangular shaped with four wall surfaces, the projection has a length measured from the wall surface parallel and closest to the first end of the ring gear to the wall surface parallel and closest to the second end of the ring gear. The projection has a length about equal to or less than the height of the ring gear. The projection may be about 2 mm or more, about 5 mm or more, about 1 cm or more, or about 3 cm or more. The projection may be about 50 cm or less, about 20 cm or less, or about 10 cm or less. The projection may have a width measured as the distance between the two wall surfaces perpendicular to the ring gears first end and second end. The projection may be sized such that it is engaged within a channel, such a channel of the housing.

The housing may include a channel. The channel may function to limit the degree of rotation of the ring gear in at least one of the driving directions. The channel may be an aperture in the housing. The channel may be located on the exterior surface wall of the housing. The channel may extend inward from an end of the housing. Preferably, the channel extends inward from the first end of the housing. The channel may include a first surface and a second surface. The channel may have a width measured as the distance between the first surface and the second surface. The width of the channel may be about equal to or larger than the width of the ring gear projection. The width of the channel may allow the projection to slide within the channel, such that the ring gear may have a limited degree of rotation within the housing. The first surface, the second surface, or both may contact the ring gear projection to prevent the ring gear from rotating. The first surface, the second surface, or both may prevent the ring gear from restricting rotation of the planetary carrier. For example, the channel may have a width that permits the ring gear to rotate by about forty-five degrees or less, preferably by about twenty degrees or less, or more preferably by about ten degrees or less. The channel may have a width that permits the ring gear to rotate by about one degree or more, preferably by about two degrees or more, or more preferably by about five degrees or more.

The ring gear may include one or more notches. The notches may function to receive a portion of the coil spring, such as the first tang. The notch may function to apply force to the coil spring, such as the first tang, in at least one of the driving directions. The notch may be a cut-out on the outer circumferential surface of the ring gear. The notch may extend inward from the second end of the ring gear. The notch may include at least one sidewall perpendicular to the second end of the ring gear. The notch may have a width. The width may be about equal to or greater than the width of the first tang of the coil spring. The width may allow for movement of the first tang within the notch. The notch may be spaced from a feature of the housing, such as the channel. The notch may be spaced from the channel so that when the ring gear rotates in one direction, such as opposite a first direction of torque, the channel prevents the notch from applying a contact force to the coil spring. The notch may be spaced from the channel so that when the ring gear rotates in an opposing direction, such as opposite a second direction of torque, the channel allows the notch to apply a contact force the coil spring. For example, when the ring gear rotates within the housing, a surface of the channel may contact a feature of the ring gear before a sidewall of the notch contacts a tang of the coil spring. For example, when the ring gear rotates within the housing, a surface of the channel may contact a feature of the ring gear after a sidewall of the notch contacts a tang of the coil spring. Preferably, the first surface of the channel contacts the projection of the ring gear before a sidewall of the notch contacts the first tang. Preferably, the second surface of the channel contacts the projection of the ring gear after a sidewall of the notch contacts the first tang. Preferably, the first surface of the channel contacts the projection of the ring gear when the planetary gear assembly is driven in a driving direction. More preferably, the first surface of the channel contacts the projection of the ring gear when a first direction of torque is applied to the input shaft. When the sidewall of the notch is prevented from contacting the first tang, there is may be no force applied to the first tang. In preventing force from being applied to the first tang, the coil spring may tend to expand or remain expanded, such that torque applied to the input shaft may allow rotation of the planetary carrier which may result in rotation of the output shaft. Preferably, the second surface of the channel contacts the projection of the ring gear after the notch sidewall contacts the first tang when the planetary gear assembly is driven in a driving direction. More preferably, the second surface of the channel contacts the projection of the ring gear after a sidewall of the notch contacts the first tang of the coil spring when a second direction of torque is applied to the input shaft. The second direction of torque applied to the input shaft may be the direction of torque that tends to contract the coil spring. A sidewall of the notch may contact and may apply a counter-force to the first tang. The counter-force on the first tang may prevent the coil spring from contracting, thereby preventing the coil spring from having a reduced inner diameter. With the coil spring prevented from contracting, the planetary carrier may be able to rotate within the coil spring.

The housing may include one or more apertures. The apertures may function to receive and retain a portion of the coil spring, such as the second tang. The apertures may function to restrict a portion of the coil spring, such as the second tang, from rotating. The aperture may be located on the exterior perimeter surface of the housing. The aperture may have a shape similar to the shape of a cross-section of the coil spring. The aperture may be shaped such as the cross-section of the second tang of the coil spring. The aperture may have a width and a length. The aperture may be sized to receive a portion of the coil spring. The aperture may be sized to receive the second tang of the coil spring. The aperture may be sized as to restrict movement of the second tang of the coil spring. For example, if torque is applied to the coil spring such that the coil spring wants to rotate within the housing, the second tang is prevented from rotating or any other movement. By restricting movement of the second tang, the housing may apply force to the second tang such that the coil spring is twisted and the inner diameter of the coil spring decreases.

The planetary gear assembly may be connected to a drive source. The drive source may drive the planetary gear assembly in at least one driving direction. The drive source may apply a first direction of torque, a second direction of torque, or both to the input shaft. The drive source may be a motor or other power supply. The drive source may be an electric motor, a pneumatic power supply, a hydraulic power supply, another other power supply, or a combination thereof, that is capable of driving the planetary gear assembly in at least one driving direction. The drive source may be in direct contact or indirect contact with the input shaft, the housing, and/or the ring gear.

The planetary gear assembly of the disclosure may be coupled to a torque multiplication assembly. The torque multiplication assembly may be in communication with the input shaft or the output shaft. The torque multiplication assembly may function to transfer an input torque. The torque multiplication assembly may function to increase an input torque. The torque multiplication assembly may be at least partially in communication with the planetary carrier. The torque multiplication assembly may be any type of assembly which can provide the function of torque multiplication.

The planetary gear assembly of the disclosure may find particular use in a brake system. The brake system may be an existing disc brake system for vehicles. For example, the disc brake system may be used with almost any vehicle (e.g., car, truck, bus, train, airplane, or the like). Alternatively, the disc brake system may be integrated into assemblies used for manufacturing or other equipment that may require a brake, such as a lathe, winder for paper products or cloth, amusement park rides, wind turbines, or the like. However, the present teachings are most suitable for use with a passenger vehicle (e.g., a car, truck, sports utility vehicle, or the like). For example, the planetary gear assembly may find particular use in the brake systems disclosed in application Ser. Nos. 14/567,617 and 14/529,739 which are expressly incorporated herein by reference for all purposes regarding the braking systems, the planetary gear assemblies, or both. The disclosure further relates to a brake system including the planetary gear assembly of the disclosure. The planetary gear assembly includes a planetary carrier. The planetary gear assembly may be connected to a torque multiplication assembly at least partially in communication with the planetary carrier, the torque multiplication assembly being of any type capable of providing the torque multiplication function. The planetary gear assembly includes a coil spring extending all or a portion of the planetary carrier and a portion of the housing, the coil spring including a first tang that is in communication with the ring gear. The planetary gear assembly includes a housing that contains the planetary carrier, and the coil spring, and the coil spring includes a second tang that is in communication with the housing; and may contain part or all of a torque multiplication assembly. The brake system includes at least one rotary to linear actuator in direct or indirect communication with the planetary gear assembly. The brake system functions so that the planetary carrier rotates within the coil spring in one or more driving directions so that torque is provided to the output shaft of the planetary gear assembly The brake system functions so that torque provided by the output shaft directly or indirectly moves the at least one rotary to linear actuator along an axis so that during movement of at least a portion of the at least one rotary to linear actuator, two or more brake shoes or brake pads respectively are moved to create a brake force or moved to release a brake force. The brake system may function so that after a brake force is created and when no torque is applied to the input shaft, the coil spring constricts and contacts the planetary carrier with sufficient force so that movement of the planetary carrier is prevented in at least one of the driving directions.

The teachings herein provide a brake system. The brake system may function to provide a friction force such as a braking force, a parking brake force, a stopping force, or a combination thereof. The brake system may create a braking force, which is a force that stops rotation of a rotor, stops rotation of a drum, stops movement of a vehicle, or a combination thereof. The brake system may create a braking force, an emergency brake force, or both, which is a force that prevents rotation of a rotor, rotation of a drum, movement of the vehicle, or combination thereof when the vehicle is in a stopped position, is turned off, or both. The brake system may be a pneumatic brake system, an electrical brake system, a hydraulic brake system, or a combination thereof. Preferably, at least a portion of the brake system as taught herein is an electric brake system. The brake system includes the planetary gear system of this disclosure. The brake system may include one or more additional power transfer devices (e.g., a belt, gears, etc. . . . ) that transfer power from a power source (e.g., a motor) to one or more brake shoes or brake pads. The brake system may include additional gearing that transfers power from a motor to one or more brake shoes or brake pads. The brake system may include gearing such as a differential assembly that splits power between two halves of the brake system, a torque multiplication assembly that reduces a rotational speed from a motor and increases torque from the motor, or both. The gear reduction ratio of the total brake system, including but not limited to the planetary gear system, differential assemblies, torque multiplication assemblies, or both, may be about 50:1 or more, about 75:1 or more, or about 100:1 or more (e.g., all of the gears of the brake system may have a gearing of about 100 and the drive shaft or input shaft may have a gearing of about 1). The gear reduction ratio the total brake system may be about 500:1 or less, about 400:1 or less, about 300:1 or less, preferably about 250:1 or less, or more preferably about 200:1 or less. The brake system may include one or more brake shoes, one or more pads, one or more pistons, one or more rotors with a hat, a link, a cable, one or more drums, or a combination thereof.

The one or more brake shoes or one or more brake pads function to create a friction force (e.g., a stopping force, a parking force, a braking force, or a combination thereof) when moved into contact with another member (e.g., a rotor, drum, or the like). The one or more brake shoes may include one or more portions that assist in creating a friction force. The one or more brake shoes may be generally curved so that when moved radially outward a friction force is created between the brake shoes and the drum and/or hat. The one or more brake shoes may include a pressure plate and friction material. The one or more brake shoes may be opposing brake shoes that extend radially outward to create a friction force. The one or more brake shoes may contact opposing sides of a member during application of a friction force.

The at least one rotary to linear actuator may function to move one or more brake shoes to create a friction force. The at least one linear actuator may move one or more brake shoes in unison, individually, or a combination of both to create a friction force. The at least one rotary to linear actuator may be a drive screws and may each move an end of the one or more brake shoes. A portion of the at least one rotary to linear actuator may move along an axis so that the at least one or more brake shoes are moved into contact with a rotor or a drum and/or hat to create a friction force. A rotational speed of the at least one rotary to linear actuator may be lower than a rotational speed of the motor. The rotational speed of the at least one rotary to linear actuator may be reduced relative to the motor speed by the planetary gear assembly and one or more reduction gears, one or more torque multiplication assemblies, or both. The at least one rotary to linear actor may include one or more housings that are connected directly and/or indirectly to a motor.

The brake system may include a motor. The motor of the brake system may be the drive source of the planetary gear assembly. The motor may function to provide energy to the brake system so that a friction force is created. The motor may function to directly and/or indirectly move one or more rotary to linear actuator assemblies. The motor may be any power supply that, when incorporated into the brake system and energized, will move one or more brake shoes to create a braking force, release a braking force, or both. The creation of braking force may result from applying torque to the input shaft in a first direction. Releasing the braking force may result from applying torque to the input shaft in a second direction.

The brake system may include a differential assembly. The differential assembly may function to transfer energy to one or more drive screws so that the drive screws will move one or more brake shoes to create a braking force, release a braking force, or both. The differential assembly may function to actuate the drive screws individually, in unison, or both. The differential assembly may be an epicyclical differential, a spur gear differential, a miter gear differential, a planetary differential, or a combination thereof. The differential assembly may be in communication with the torque multiplication assembly, such as a planetary assembly, an epicyclical assembly, another differential assembly, or a combination thereof that provides power to the pair of linear actuators, provides gear reduction, provides an increase in torque, or a combination thereof. The differential assembly may function to transfer power to the drive screw assemblies based upon the resistance of each of the drive screws. The differential assembly may function to stop transferring energy to one drive screw when resistance increases and divert additional energy to the drive screw with a lower resistance so that the energy supplied to the drive screw with the lower resistance is increased by a factor of 1.5 or more or 2 or less. The differential assembly may alternate transferring power to the drive screws depending on which drive screw exhibits the least resistance during movement of the drive screws to create a friction force. For example, the differential assembly may assist in moving two drive screws (and associated brake shoes) simultaneously until a resistance on one side increases and then the differential assembly will transfer all of the energy to the drive screw with the lower resistance so that the lower resistance brake assembly is moved twice as fast as when both assemblies are actuated. The differential assembly will alternate and/or simultaneously transfer energy to the drive screw until a predetermined friction force is created.

A torque multiplication assembly may function to change the rate of rotation of the gears in a system relative to the rate of rotation of a power source, change the torque provided to downstream gears relative to the torque provided by the power source, or both. Preferably, the torque multiplication assembly increases torque provided by the power source and reduces the rate of rotation of downstream gears. The torque multiplication system may be directly connected to the power source, differential assembly, linear actuators, or combination thereof. The torque multiplication system may be any assembly that increases torque, reduces the rate of rotation of gears, or both. The torque multiplication assembly and differential assembly as discussed herein may both include parts that are discussed in conjunction with the other. The parts of the torque multiplication assembly and the differential assembly as discussed herein may be used interchangeably to perform the function recited herein for each respective device. Thus, for example, both the torque multiplication assembly and the differential assembly may include a planet gear and the planet gear may increase torque in the torque multiplication assembly and allow two halves of the differential to operate independently in the differential assembly. The torque multiplication assembly may be a planetary assembly.

The planetary gear assembly of the disclosure functions to provide power to one or more rotary to linear actuator in unison and/or individually so that brake shoes are moved and a braking force is created. The planetary gear assembly may increase torque provided to one or more rotary to linear actuators. The planetary gear assembly may reduce a rate of rotation so that an output rotation is slower than an input rate of rotation. The planetary gear assembly of the disclosure functions to apply a braking force, release a braking force, sustain a braking force, or a combination.

The planetary gear assembly of the disclosure may further include one or more of the features described in this specification in any combination, including the preferences and examples listed in this specification, and including the following features: the coil spring may be a helical torsion spring; the housing may include a channel, the ring gear may include a projection engaged in the channel, and the channel may limit a degree of rotation of the ring gear in at least one of the driving directions; when torque is applied to the input shaft in one of the one or more driving directions it may result in rotation of the planetary carrier in a first direction and rotation of the ring gear in a direction opposing that of the planetary carrier may be restricted by the projection contact a first surface of the channel; when torque is applied to the input shaft in another of the one or more driving directions it may result in rotation of the planetary carrier in a second direction and rotation of the ring gear in a direction opposing that of the planetary carrier may be restricted by the projection contacting a second surface of the channel; the ring gear may include a notch, the first tang of the coil spring may be seated within the notch, and the notch may apply a force to the first tang of the coil spring in at least one of the one or more driving directions; when torque is applied to the input shaft in one of the one or more driving directions it may result in rotation of the planetary carrier in a first direction and rotation of the ring gear in a direction opposing that of the planetary carrier may be restricted by the projection contacting a first surface of the channel, and the first surface may prevent the ring gear from rotating to a position in which the notch may apply force to the first tang of the coil spring; one of the one or more driving directions may be a direction of torque applied to the input shaft which may result in rotation of the planetary carrier in the direction that may tend to contract the coil spring; when torque is applied to the input shaft in a direction which may result in rotation of the planetary carrier in a direction that may tend to contract the coil spring, rotation of the ring gear in a direction opposing that of the planetary carrier may be restricted by the projection contacting a second surface of the channel; when torque is applied to the input shaft in a direction that may result in rotation of the planetary carrier in a direction that may tend to contract the coil spring, the notch may apply force to the first tang in a direction tending to expand the coil spring so that the coil spring may not further contract about the planetary carrier; and when no torque is applied to the input shaft and torque is applied to the output shaft in the direction of torque that may tend to contract the coil spring, the coil spring may contract about the planetary carrier and a portion of the housing thereby restricting the planetary carrier from rotating further relative to the housing.

The brake system of the disclosure may further include one or more of the features described in this specification in any combination, including the preferences listed in this specification, and including the following features: when for is applied to the input shaft in a direction which may result in rotation of the planetary carrier in a direction that tends to contract the coil spring the at least on rotary to linear actuator may move to release a brake force; when a torque is applied to the output shaft by the at least one rotary to linear actuator in a direction which may tend to contract the coil spring, the contact between the coil spring and the planetary carrier may restrict the planetary carrier from continuing to rotate and the brake system may sustain a created brake force; and a motor may apply torque to the input shaft for the one or more driving directions and may not supply torque directly to the output shaft.

ILLUSTRATIVE EMBODIMENTS

The following descriptions of the Figures are provided to illustrate the teachings, but are not intended to limit the scope thereof.

Figure 1:
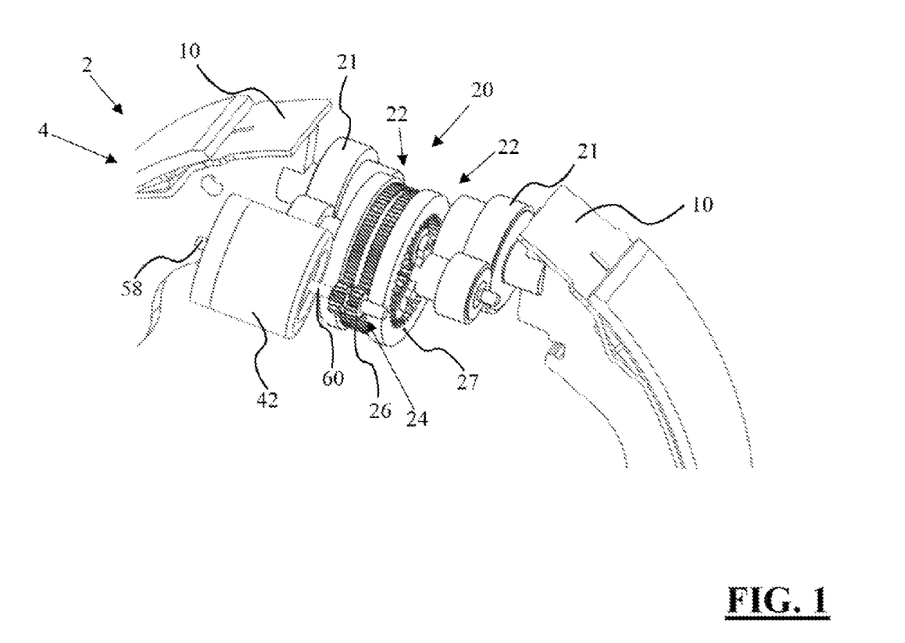
FIG. 1 is a perspective view of a brake system incorporating planetary gear assemblies and rotary to linear actuators to which the teachings herein can be applied.

FIG. 1 illustrates a brake system 2. The brake system 2 as illustrated is a drum brake 4 that includes a pair of opposing brake shoes 10 with a rotary to linear actuation assembly 20 located therebetween. The rotary to linear actuation assembly 20 includes a differential assembly 22. The rotary to linear actuation assembly 20 includes at least one rotary to linear actuator 21. The rotary to linear actuation assembly 20 distributes force between the two brake shoes 10 (however the rotary to linear actuation assembly may separate force between two or more brake pads). The differential assembly 22 includes a torque multiplication assembly 24 that consists of a pair of ring gears 27 and a pair of pinion gears 26. The pinion gears 26 are in contact with an output shaft 60. The output shaft 60 extends from a housing 42. The housing 42 includes a planetary gear assembly 50 (not shown). An input drive shaft 58 is located opposite the output drive shaft 60.

Figure 2:
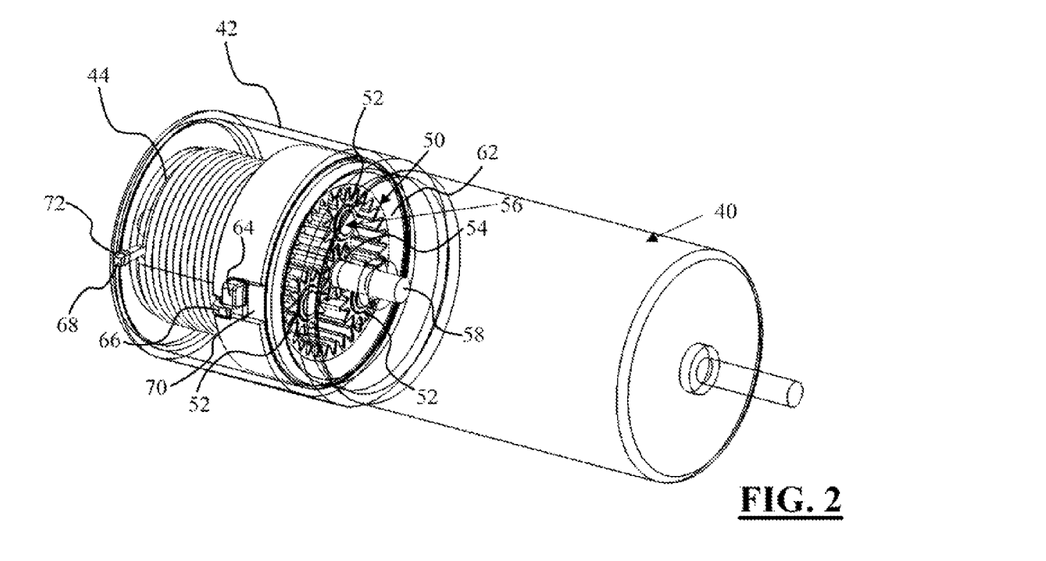
FIG. 2 is a close-up view of a planetary gear assembly engaged with a motor assembly.

FIG. 2 is a close-up view of a planetary gear assembly 50 engaged with a motor assembly 40. The motor assembly 40 is located next to a planetary gear assembly 50. The planetary gear assembly 50 is located next to and in communication with the motor assembly 40 that provides a torque to a desired location. The planetary gear assembly 50 has a plurality of planetary gears 52 that are located around a sun gear 54 and all of which are located within a ring gear 62. The sun gear 54 includes an input drive shaft 58 that extends from the motor assembly 40. The planetary gears 52 are located on a planetary carrier 56. A coil spring 44, shown as a helical torsion or wrap spring, extends at least partially around a portion of the planetary carrier 56 and a cylindrical portion 43 of the housing 42. The coil spring 44 is in contact with both the planetary carrier 56 and the cylindrical portion 43 in its at-rest condition. The coil spring 44 includes a first tang 66 interposed between the ring gear 62 and the housing 42 which is engaged within a notch 74 of the ring gear 62. The coil spring 44 includes a second tang 68 which extends through an aperture 72 in the housing. The aperture 72 is sized such that it restricts any rotational movement of the first tang 66. The ring gear 62 includes a projection 64 which extends through a channel 70 in the housing 42. The channel 70 is sized such that it limits the movement of the projection 64, thereby limiting the degree of rotation of the ring gear 62.

Figure 3:
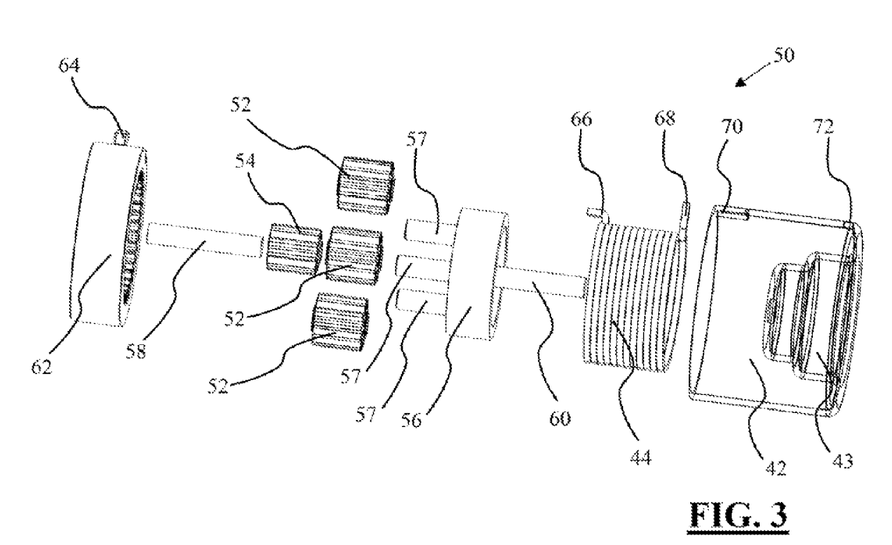
FIG. 3 is an exploded view of a planetary gear assembly.

FIG. 3 is an exploded view of a planetary gear assembly 50. The planetary gear assembly includes a planetary carrier 56. The planetary carrier 56 receives planetary gears 52 on planetary carrier shafts 57. The planetary carrier 56 includes an output drive shaft 60 extending opposite from the planetary carrier shafts 57 and planetary gears 52. The planetary gears 52 are engaged with and orbit around a sun gear 54. The sun gear 54 receives and is rotated by an input drive shaft 58. A coil spring 44 extends at least partially around a portion of the planetary carrier 56. The coil spring 44 includes a first tang 66 and a second tang 68. A housing 42 houses the coil spring 44, the planetary carrier 56, the planetary gears 52, and the sun gear 54. The housing 42 includes a cylindrical portion 43, a channel 70 and an aperture 72. The coil spring 44 can engage with the cylindrical portion 43. Interposed between the housing 42 and the planetary gears 52 is a ring gear 62. The ring gear 62 normally resists torque from the planetary gears 52, resulting in rotation of the planetary carrier 56. The ring gear 62 includes a projection 64.

Figure 4:
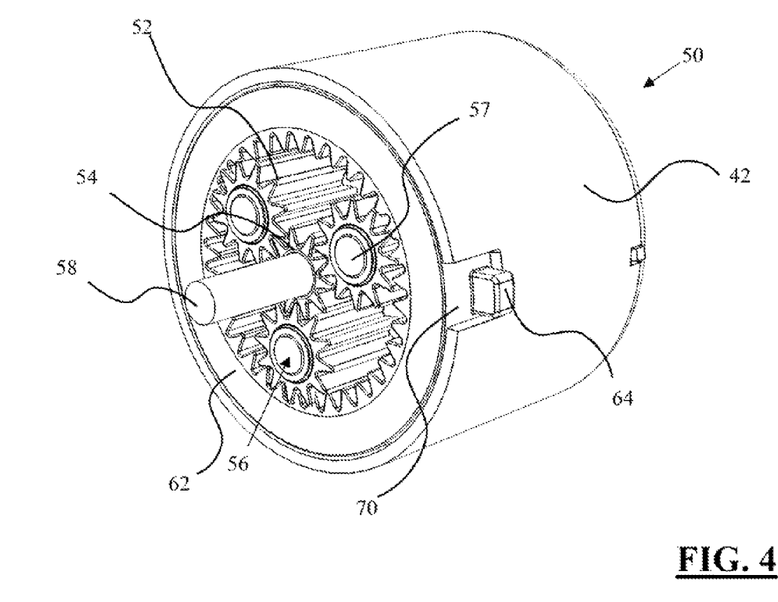
FIG. 4 is a perspective view of a planetary gear assembly within a housing.

FIG. 4 illustrates a close-up perspective view of a planetary gear assembly 50 within a housing 42. The planetary gear assembly 50 includes a sun gear 54 which rotates and is orbited by planetary gears 52. The planetary gears 52 are supported by and rotate about planetary carrier shafts 57 which are part of a planetary carrier 56. The sun gear 54 receives and is rotated by an input drive shaft 58. A housing 42 encloses the planetary gears 52, the sun gear 54, and the planetary carrier 56. A ring gear 62 is interposed between the housing 42 and the planetary gears 52. The ring gear 62 receives torque from and is rotated by the planetary gears 52. The ring gear 62 includes a projection 64 received in a channel 70 of the housing 42. The channel 70 is sized such that it limits the movement of the projection 64, thereby limiting the degree of rotation of the ring gear 62 when torque is applied from the planetary gears 52.

Figure 5:
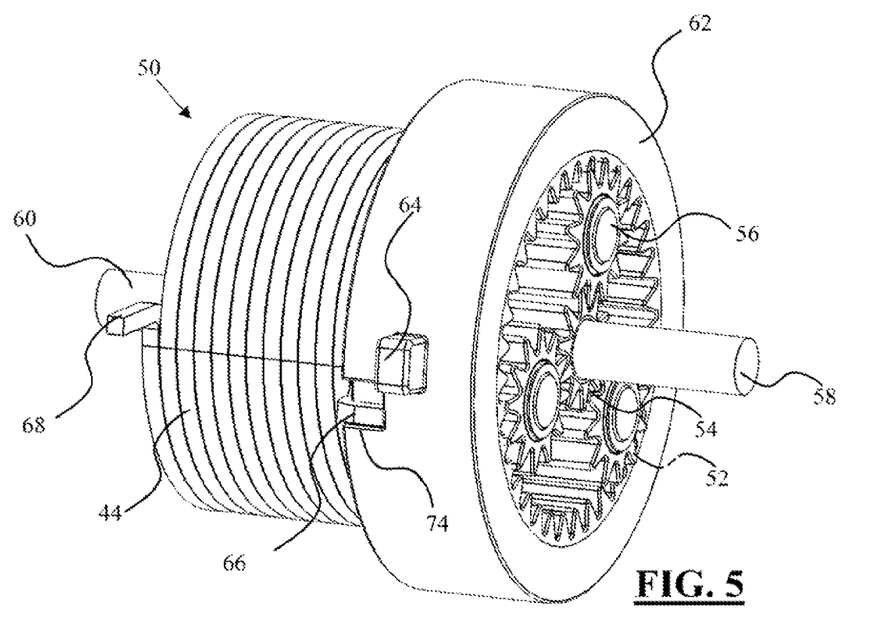
FIG. 5 is a perspective view of a planetary gear assembly without a housing.

FIG. 5 illustrates a close-up perspective view of a planetary gear assembly 50 without a housing 42 (not shown). A sun gear 54 receives and is rotated by an input drive shaft 58. The sun gear 54 is orbited by and rotates planetary gears 52. The planetary gears 52 are enclosed by and apply torque to a ring gear 62. A planetary carrier 56 supports and is rotated by the planetary gears 52. The planetary carrier 56 includes an output drive shaft 60 opposite the input drive shaft 58 and extending away from the planetary gears 52. A coil spring 44, shown as a wrap or helical torsion spring, extends around at least a portion of the planetary carrier 56 and a cylindrical portion 43 of the housing 42. The coil spring 44 includes a first tang 66 and a second tang 68. The first tang 66 is engaged within a notch 74 of the ring gear 62. The ring gear 62 further includes a projection 64.

Figure 6:
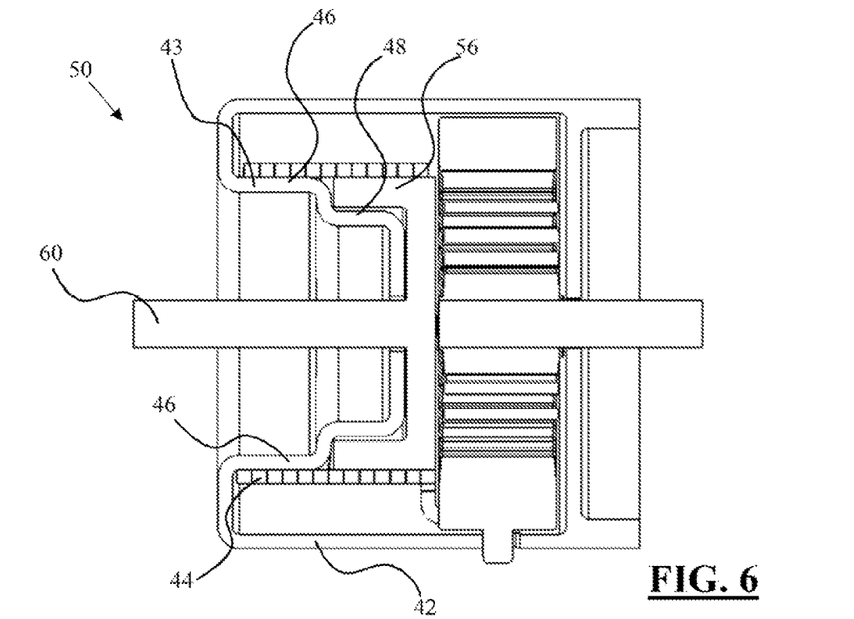
FIG. 6 is a cross-sectional view of a planetary gear assembly.

FIG. 6 illustrates a cross-sectional view of a planetary gear assembly 50. The inner cylindrical portion 43 may be tiered, such as to include a first tier 46 and a second tier 48. An inner cylindrical portion 43 is at least partially encircled by the coil spring 44. As shown, the coil spring 44 at least partially surrounds the first tier 46 of the inner cylindrical portion 43. A planetary carrier 56 of a planetary gear assembly 50 is at least partially encircled by a coil spring 44, shown as a wrap or helical torsion spring. The planetary carrier 56 partially encircles a portion of the housing 44, such as the second tier 48. An output drive shaft 60 extends from the planetary carrier 56. The coil spring 44 can either expand to allow rotation of the planetary carrier member 56 or can constrict to engage the planetary carrier 56 and the cylindrical portion 43 of the housing 42 with sufficient force to restrict rotation of the planetary carrier 56.

Figure 7:
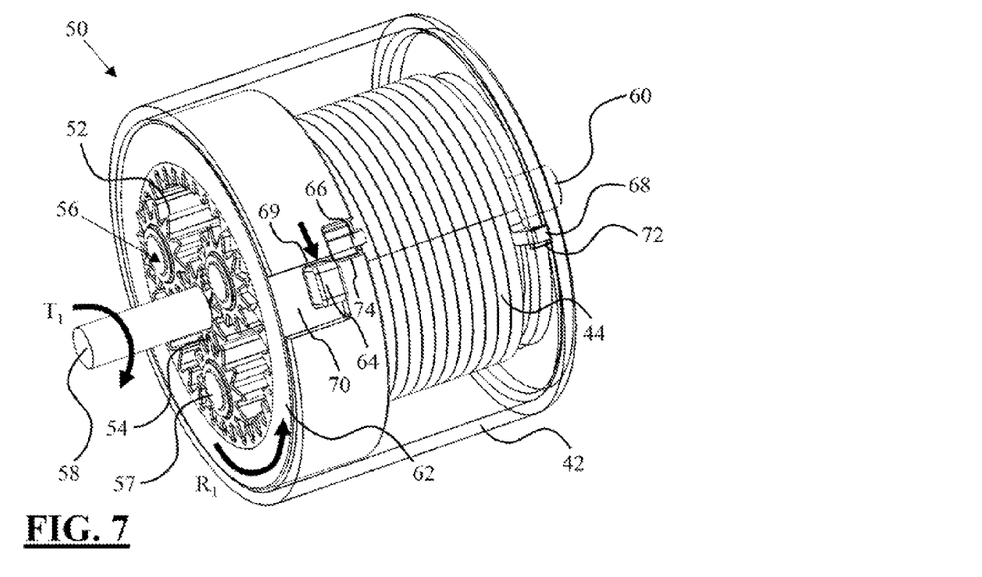
FIG. 7 is a partially transparent view of the planetary gear assembly.

FIG. 7 illustrates a partially transparent view of the planetary gear assembly 50. When driven in a driving direction, such as a first direction of torque ($T_1$) applied to an input drive shaft 58, the input drive shaft 58 rotates a sun gear 54 in the driving direction. The sun gear 54 is orbited by and rotates planetary gears 52 in a direction opposite the first direction. A planetary carrier shaft 57 is received by each planetary gear 52. The planetary gears 52 rotate about the planetary carrier shafts 57. The planetary carrier 56 includes an output drive shaft 60 extending opposite from the planetary gear shafts 57. The planetary carrier 56 rotates in the first direction under influence from the sun gear 54. The planetary carrier 56 produces an increased torque on the output drive shaft 60, and the output drive shaft 60 rotates in the first direction. A ring gear 62 is driven by the planetary gears 52 in a direction ($R_1$) opposite the first direction. The ring gear 62 includes a projection 64. A first surface 69 of the channel 70 applies force to the projection 64, thereby restricting the degree of rotation of the ring gear 62 in the direction ($R_1$) opposite to the first direction. A coil spring 44, shown as a wrap or helical torsion spring, encircles about the planetary carrier 56. The coil spring 44 includes a first tang 66 and second tang 68. The second tang 68 is received in an aperture 72 of the housing 42. The first tang 66 is engaged within a notch 74 of the ring gear 62. The housing 42 restricts the ring gear 62 from applying force to the first tang 66. Specifically, the first surface 69 of the channel 70 is located on the housing 42, such that the first surface 69 contacts the projection 64 before a sidewall of the notch 74 contacts the first tang 66. Rotation of the planetary carrier 56 in the first direction of torque is the same direction of torque that tends to expand the coil spring 44. When the coil spring 44 is expanded, the torque on the planetary carrier 56 is sufficient to overcome the torque due to contact with the coil spring 44 and the planetary carrier 56 can rotate as it is driven.

Figure 8:
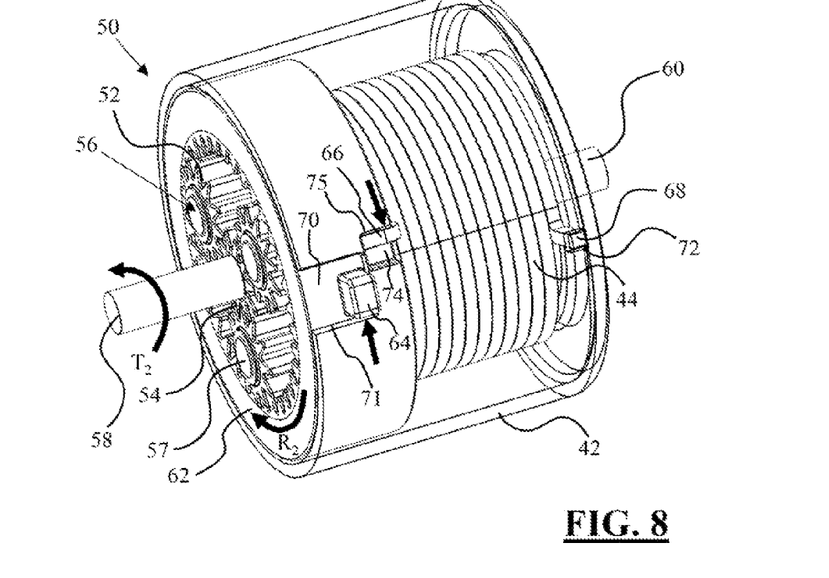
FIG. 8 is a partially transparent view of the planetary gear assembly.

FIG. 8 illustrates a partially transparent view of the planetary gear assembly 50. When driven in a driving direction, such as a second direction of torque ($T_2$) applied to an input drive shaft 58, the input drive shaft 58 rotates a sun gear 54 in the driving direction. The sun gear 54 is orbited by and rotates planetary gears 52 in a direction opposite the second direction. A planetary carrier shaft 57 is received by each planetary gear 52. The planetary gears 52 rotate about the planetary carrier shafts 57. The planetary carrier 56 includes an output drive shaft 60 extending opposite from the planetary gear shafts 57. The planetary carrier 56 rotates in the second direction under influence from the sun gear 54. The planetary carrier 56 produces an increased torque on the output drive shaft 60, and the output drive shaft 60 rotates in the second direction. A ring gear 62 is driven by the planetary gears 52 in a direction ($R_2$) opposite the second direction. The ring gear 62 includes a projection 64. A coil spring 44, encircles about the planetary carrier 56. The coil spring 44 includes a first tang 66 and second tang 68. The second tang 68 is received in an aperture 72 of the housing 42. The first tang 66 is engaged within a notch 74 of the ring gear 62. The housing 42 allows the ring gear 62 to apply force to the coil spring 44. Specifically, the second surface 71 of the channel 70 is located on the housing 42, such that the second surface 71 contacts the projection 64 to restrict rotation of the ring gear 62 but permits a sidewall 75 of the notch 74 to apply force to the first tang 66. The second direction of torque is the same direction of torque that contracts the coil spring 44. The sidewall 75 applies a force opposite the second direction of torque which forces the coil spring 44 to expand, remain expanded, or both expand and remain expanded. When the coil spring 44 is expanded, the torque on the planetary carrier 56 is sufficient to overcome the torque due to contact with the coil spring 44 and the planetary carrier 56; and the output drive shaft 60 rotates within the coil spring 44. At this time, projection 64 comes into contact with a second surface 71 of the channel 70 in the housing 42, thereby restricting rotation of the ring gear 62 in the direction ($R_2$) opposite to the second direction.

Figure 9:
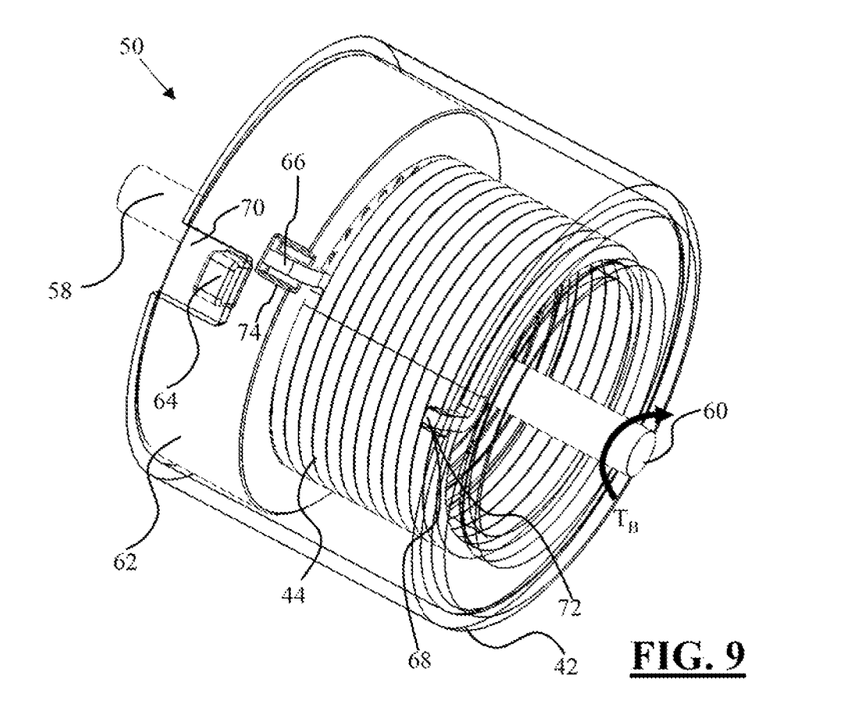
FIG. 9 is a partially transparent view of the planetary gear assembly.

FIG. 9 illustrates a partially transparent view of the planetary gear assembly 50. When no torque is applied to the input shaft 58 and a torque ($T_B$) in a direction opposite the first direction of torque ($T_1$) is applied to an output drive shaft 60, the planetary carrier 56 rotates in the direction of torque ($T_B$) which is the direction of torque that contracts the coil spring 44. The rotation of the planetary carrier 56 applies rotational force to the coil spring 44 in the direction which tends to cause the diameter of the coil spring 44 to decrease. The rotational force causes additional contact force between the coil spring 44 and the planetary carrier 56, and between the coil spring 44 and cylindrical portion 43 of the housing 42, thereby restricting or locking movement of the planetary carrier 56 relative to the housing 42. By locking the planetary carrier 56, the output drive shaft 60 is restricted from rotating.

Any numerical values recited in the above application include all values from the lower value to the upper value in increments of one unit provided that there is a separation of at least 2 units between any lower value and any higher value. These are only examples of what is specifically intended and all possible combinations of numerical values between the lowest value, and the highest value enumerated are to be considered to be expressly stated in this application in a similar manner. Unless otherwise stated, all ranges include both endpoints and all numbers between the endpoints. The term "consisting essentially of" to describe a combination shall include the elements, ingredients, components, or steps identified, and such other elements ingredients, components or steps that do not materially affect the basic and novel characteristics of the combination. The use of the terms "comprising" or "including" to describe combinations of elements, ingredients, components, or steps herein also contemplates embodiments that consist essentially of the elements, ingredients, components, or steps. Plural elements, ingredients, components, or steps can be provided by a single integrated element, ingredient, component, or step. Alternatively, a single integrated element, ingredient, component, or step might be divided into separate plural elements, ingredients, components, or steps. The disclosure of "a" or "one" to describe an element, ingredient, component, or step is not intended to foreclose additional elements, ingredients, components, or steps.

What is claimed is:

1. A planetary gear assembly comprising:
   a) a housing which contains:
      (i) a planetary carrier;
      (ii) a sun gear;
      (iii) at least one planetary gear;
      (iv) a ring gear; and
      (v) a coil spring which extends around all or a portion of the planetary carrier;
   b) an input shaft; and
   c) an output shaft;
      wherein the coil spring includes a first tang that is in communication with the ring gear and a second tang that is in communication with the housing;
      wherein when torque is applied to the input shaft, the planetary carrier rotates within the coil spring in one or more driving directions so that torque is transferred to the output shaft;
      wherein when no torque is applied to the input shaft and torque in one direction is applied to the output shaft, the coil spring constricts and provides sufficient contact force to the planetary carrier and to the housing to prevent the planetary carrier from moving relative to the housing in at least one of the one or more driving directions: and
      wherein the housing includes a channel, the ring gear includes a projection engaged in the channel, and the channel limits a degree of rotation of the ring gear in at least one of the one or more driving directions.

2. The planetary gear assembly of claim 1, wherein the coil spring is a helical torsion spring.

3. The planetary gear assembly of claim 1, wherein when torque is applied to the input shaft in one of the one or more driving directions this results in rotation of the planetary carrier in a first direction and rotation of the ring gear in a direction opposing that of the planetary carrier is restricted by the projection contacting a first surface of the channel; and
   wherein when torque is applied to the input shaft in another of the one or more driving directions this results in rotation of the planetary carrier in a second direction and rotation of the ring gear in a direction opposing that of the planetary carrier is restricted by the projection contacting a second surface of the channel.

4. The planetary gear assembly of claim l, wherein the ring gear includes a notch, the first tang of the coil spring is seated within the notch, and the notch can apply a force to the first tang of the coil spring in at least one of the one or more driving directions.

5. The planetary gear assembly of claim 4, wherein when torque is applied to the input shaft in one of the one or more driving directions this results in rotation of the planetary carrier in a first direction and rotation of the ring gear in a direction opposing that of the planetary carrier is restricted by the projection contacting a first surface of the channel; and
   wherein the first surface prevents the ring gear from rotating to a position in which the notch would apply force to the first tang of the coil spring.

6. The planetary gear assembly of claim 4, wherein one of the one or more driving directions is a direction of torque applied to the input shaft which results in rotation of the planetary carrier in the direction that tends to contract the coil spring.

7. The planetary gear assembly of claim 6, wherein when torque is applied to the input shaft in a direction which results in rotation of the planetary carrier in a direction that tends to contract the coil spring, rotation of the ring gear in a direction opposing that of the planetary carrier is restricted by the projection contacting a second surface of the channel.

8. The planetary gear assembly of claim 7, wherein when torque is applied to the input shaft in a direction that results in rotation of the planetary carrier in a direction that tends to contract the coil spring, the notch applies force to the first tang in a direction tending to expand the coil spring so that the coil spring does not further contract about the planetary carrier.

9. The planetary gear assembly of claim 1, wherein when no torque is applied to the input shaft and torque is applied to the output shaft in a direction of torque that tends to contract the coil spring, the coil spring contracts about the planetary carrier and a portion of the housing thereby restricting the planetary carrier from rotating further relative to the housing.

10. A brake system comprising:
a) a planetary gear assembly comprising:
(i) a housing which contains:
1) a planetary carrier;
2) a sun gear;
3) at least one planetary gear;
4) a ring gear; and
5) a coil spring which extends around all or a portion of the planetary carrier; the coil spring including a first tang that is in communication with the ring gear and a second tang that is in communication with the housing;
(ii) an input shaft; and
(iii) an output shaft;
b) at least one rotary to linear actuator in communication with the planetary gear assembly;
c) at least one torque multiplication assembly at least partially in communication with the input shaft or the output shaft of the planetary gear assembly;
wherein when torque is applied to the input shaft the planetary carrier rotates within the coil spring in one or more driving directions so that torque is transferred to the output shaft;
wherein when no torque is applied to the input shaft and torque in one direction is applied to the output shaft, the coil spring constricts and provides sufficient contact force to the planetary carrier and to the housing to prevent the planetary carrier from moving relative to the housing in at least one of the one or more driving directions;
wherein when torque is provided by the output shaft directly or indirectly to the rotary to linear actuator this results in movement of at least a portion of the rotary to linear actuator so that two or more brake shoes or brake pads respectively are moved to create a brake force or moved to release a brake force; and
wherein after a brake force is created and when no torque is applied to the input shaft, the coil spring constricts and applies sufficient force to the planetary carrier and the housing so that movement of the planetary carrier is prevented in at least one of the one or more driving directions.

11. The brake system of claim 10, wherein the coil spring is a helical torsion spring.

12. The brake system of claim 10, wherein the housing includes a channel, the ring gear includes a projection engaged in the channel, and the channel limits a degree of rotation of the ring gear in the one or more driving directions.

13. The brake system of claim 12, wherein the ring gear includes a notch, the first tang is seated within the notch, and the notch can apply a force to the coil spring in at least one of the one or more driving directions.

14. The brake system of claim 13, wherein when torque is applied to the input shaft in one of the one or more driving directions this results in rotation of the planetary carrier in a first direction and rotation of the ring gear in an a direction opposing that of the planetary carrier is restricted by the projection contacting a first surface of the channel; and
wherein the first surface prevents the ring gear from rotating to a position in which the notch would otherwise apply force to the coil spring; and
wherein when torque is applied to the input shaft in another of the one or more driving directions this results in rotation of the planetary carrier in a second direction and rotation of the ring gear in an a direction opposing that of the planetary carrier is restricted by the projection contacting a second surface of the channel.

15. The brake system of claim 13, wherein when torque is applied to the input shaft in a direction resulting in rotation of the planetary carrier in a direction that tends to contract the coil spring the at least one rotary to linear actuator moves to release a brake force.

16. The brake system of claim 15, wherein when torque is applied to the input shaft in a direction resulting in rotation of the planetary carrier in a direction tending to contract the coil spring rotation of the ring gear in a direction opposing that of the planetary carrier is restricted by the projection contacting a second surface of the channel.

17. The brake system of claim 16, wherein when torque is applied to the input shaft in a direction resulting in rotation of the planetary carrier in a direction tending to contract the coil spring, the notch applies a force to the first tang so that the coil spring does not further contract about the planetary carrier.

18. The brake system of claim 10, wherein when a torque is applied to the output shaft by the at least one rotary to linear actuator in a direction that tends to contract the coil spring, the contact between the coil spring and the planetary carrier restricts the planetary carrier from continuing to rotate and the brake system sustains a created brake force.

19. The brake system of claim 13, wherein a motor applies torque to the input shaft for the one or more driving directions and does not supply torque directly to the output shaft.

* * * * *

UNITED STATES PATENT AND TRADEMARK OFFICE
CERTIFICATE OF CORRECTION

PATENT NO. : 9,772,029 B2  
APPLICATION NO. : 14/795342  
DATED : September 26, 2017  
INVENTOR(S) : Carla Thomas Page 1 of 1

It is certified that error appears in the above-identified patent and that said Letters Patent is hereby corrected as shown below:

On the Title Page

Page 2, item (56) References Cited, U.S. Patent Documents: Delete "2014/0166417 A1 6/2014 De Taeye et. al"

In the Claims

Column 18, Line 31: Replace ":" with a --;-- after "more driving directions" and before "and"

Signed and Sealed this
Thirteenth Day of March, 2018

Andrei Iancu
*Director of the United States Patent and Trademark Office*